US009713070B1

(12) United States Patent
Cain et al.

(10) Patent No.: US 9,713,070 B1
(45) Date of Patent: Jul. 18, 2017

(54) REGIONAL CONDITIONAL ACCESS

(71) Applicant: Cisco Technology, Inc., San Jose, CA (US)

(72) Inventors: Harel Cain, Jerusalem (IL); Michal Devir, Haifa (IL); Yaron Sella, Beit Nekofa (IL); Andrew Sinton, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/239,874

(22) Filed: Aug. 18, 2016

(51) Int. Cl.
*H04W 48/10* (2009.01)
*H04W 4/02* (2009.01)

(52) U.S. Cl.
CPC ........... *H04W 48/10* (2013.01); *H04W 4/021* (2013.01)

(58) Field of Classification Search
CPC ........... H04N 21/23473; H04N 7/1675; H04N 7/163; G06F 21/602; H04L 63/0457; H04L 2209/56; H04L 2209/60; H04L 63/0428; H04L 9/088
See application file for complete search history.

(56) References Cited

U.S. PATENT DOCUMENTS

| 6,560,340 | B1 | 5/2003 | Akins, III |
| 6,587,561 | B1 | 7/2003 | Sered et al. |
| 7,986,781 | B2* | 7/2011 | Stransky ............... H04N 7/1675 380/200 |
| 7,995,603 | B2 | 8/2011 | Revital et al. |
| 8,165,293 | B2* | 4/2012 | Wajs .................... H04N 7/1675 348/569 |
| 8,255,378 | B2 | 8/2012 | Ji et al. |
| 9,232,250 | B2 | 1/2016 | Jankins et al. |
| 9,544,276 | B2* | 1/2017 | Hamon ............... H04L 63/0428 |

(Continued)

FOREIGN PATENT DOCUMENTS

| EP | 002052516 | 12/2011 |
| EP | 002849448 | 3/2015 |
| WO | 2011/028785 | 3/2011 |

OTHER PUBLICATIONS

Fiat, A. et al.; "Broadcast Encryption"; Crypto Annual Conference, 1993, pp. 480-491.

*Primary Examiner* — Sujatha Sharma
(74) *Attorney, Agent, or Firm* — Samuel M. Katz

(57) ABSTRACT

In one embodiment, a system includes a control word processor to generate first regional-specific control word formation data items (RSCWFDI), for a first geographical sub-region of a primary geographical region which includes different geographical sub-regions, for use over cryptoperiods, the first RSCWFDI being used in generating control words in receiver-decoder devices, an encryption engine to encrypt content with the control words over the cryptoperiods yielding encrypted content, a first transmission apparatus to broadcast the first RSCWFDI and the encrypted content in the primary geographic region, and a communication interface to share data about second RSCWFDI of the first geographical sub-region with at least one regional transmission apparatus of the first geographical sub-region operative to broadcast the second RSCWFDI of the geographical sub-region in the geographical sub-region, wherein each control word may be generated in the receiver-decoder devices using one of first and one second RSCWFDI.

20 Claims, 7 Drawing Sheets

(56) References Cited

U.S. PATENT DOCUMENTS

| | | | |
|---|---|---|---|
| 2003/0188154 A1* | 10/2003 | Dallard | H04N 7/163 |
| | | | 713/153 |
| 2011/0197237 A1 | 8/2011 | Turner | |
| 2013/0046969 A1* | 2/2013 | Dubroeucq | H04N 21/631 |
| | | | 713/150 |
| 2013/0132725 A1* | 5/2013 | Pochon | H04L 63/0485 |
| | | | 713/171 |
| 2014/0052983 A1* | 2/2014 | Gold | H04L 63/0428 |
| | | | 713/160 |
| 2014/0108782 A1* | 4/2014 | Salinger | G06F 21/10 |
| | | | 713/155 |

* cited by examiner

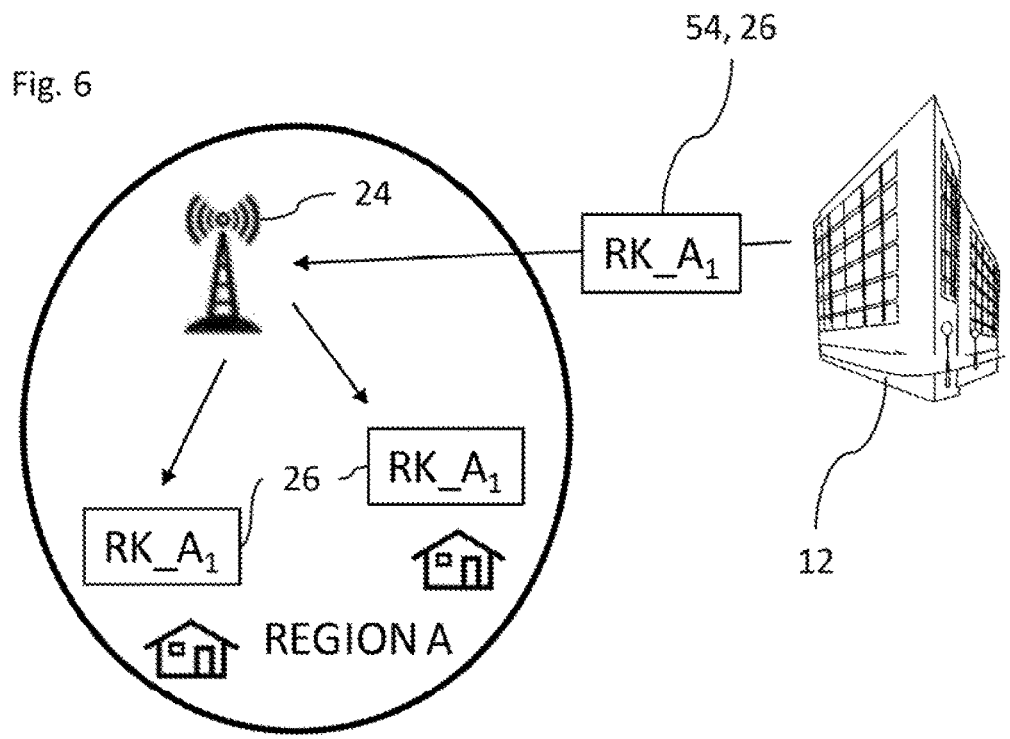
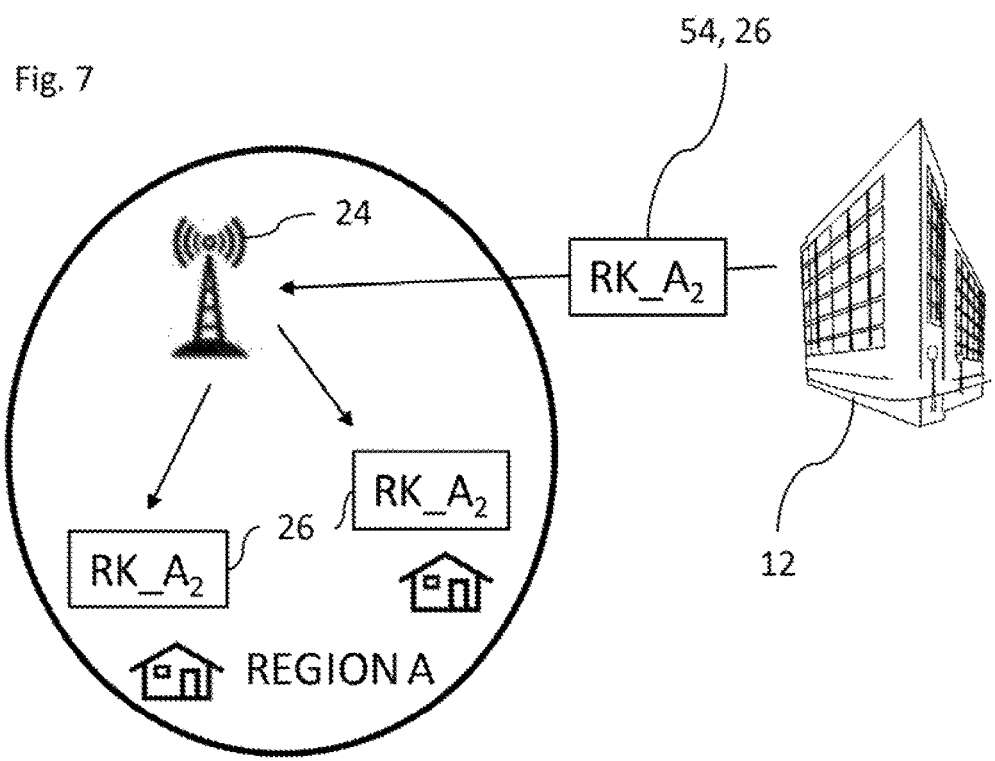

REGIONAL CONDITIONAL ACCESS

TECHNICAL FIELD

The present disclosure generally relates to regional conditional access.

BACKGROUND

In broadcast conditional access pay-TV systems, there is often a need to enforce specific position-based access criteria that are more fine-grained than the geographical resolution offered by the broadcast system's content distribution system. For example, content distribution via satellite is available over the footprint of the satellite and typically covers a very wide area. Over-the-top (OTT) content distribution service via Internet is basically available anywhere with an Internet connection. Recently, in the Chinese market, authorities want only the village population to receive content via satellite and people living in the cities to receive their content via cable.

Blackout is a well-known feature in conditional access systems. Blackout marks certain content as inaccessible by specific user devices. If the broadcaster knows where the customers live, the broadcaster can use this feature in order to prevent viewing by customers who live in certain areas. Blackout was typically used to block TV-viewing of sporting events taking place in some city by residents of that city. However, this feature has drawbacks including the broadcaster needs to know where each customer lives and a user may take the device and place it in another location. In satellite systems blackout was implemented and enforced by a secure device (e.g., a smart card) on the customer's premises. Thus the enforcement is based on a logical decision, not on cryptography per se, and generally requires the device to be secure.

BRIEF DESCRIPTION OF THE DRAWINGS

The present disclosure will be understood and appreciated more fully from the following detailed description, taken in conjunction with the drawings in which:

FIGS. 6-10 show sharing data between the Headend and a regional transmission apparatus in the system of FIG. 1;

DESCRIPTION OF EXAMPLE EMBODIMENTS

Overview

Figure 1:
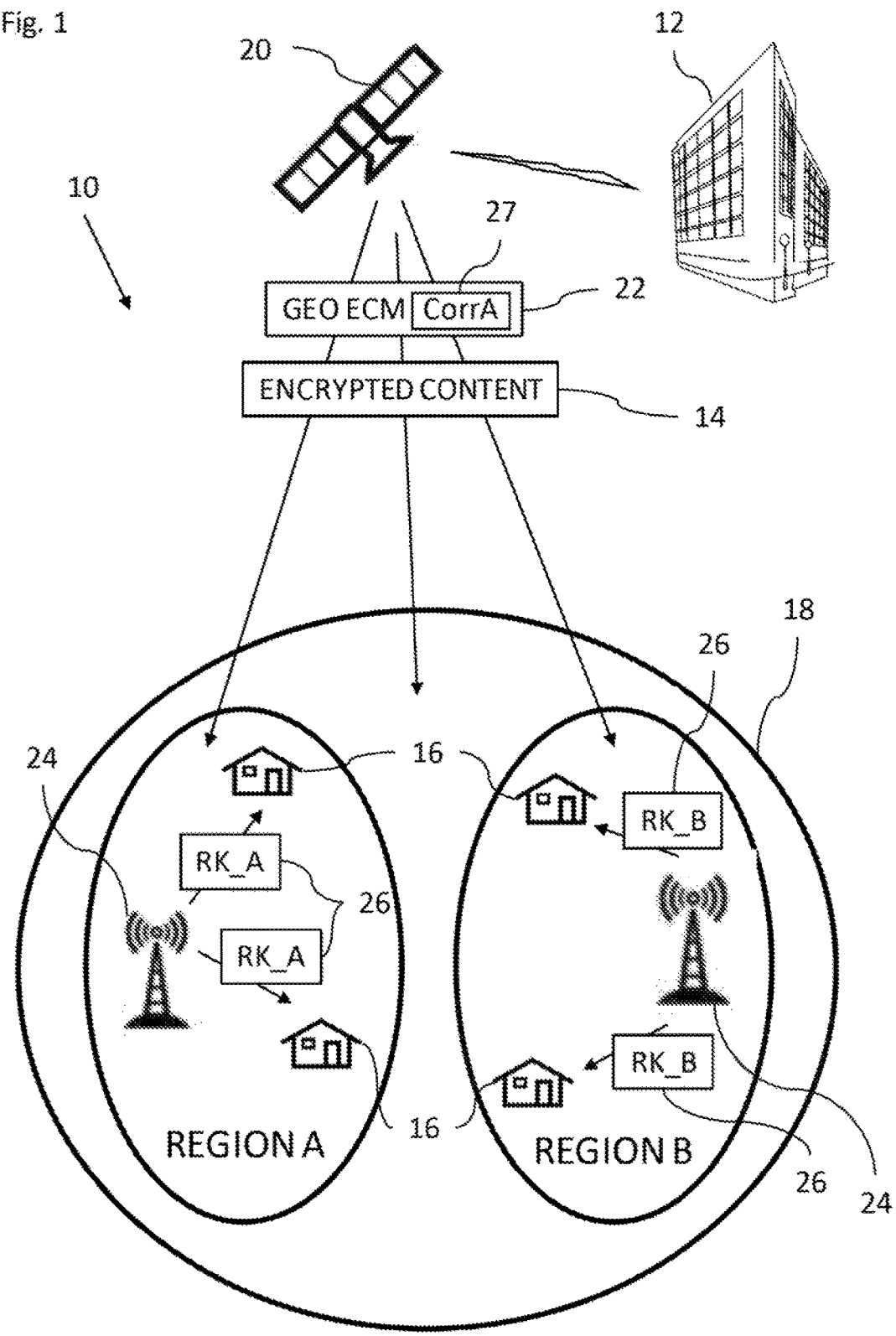
FIG. 1 is a partly pictorial, partly block diagram view of a conditional access system constructed and operative in accordance with an embodiment of the present disclosure.

There is provided in accordance with an embodiment of the present disclosure, a Headend system including a control word processor to generate a plurality of first regional-specific control word formation data items, for a first geographical sub-region of a primary geographical region which includes a plurality of different geographical sub-regions, for use over a plurality of cryptoperiods, the plurality of first regional-specific control word formation data items being used in generating a plurality of control words in a plurality of receiver-decoder devices, an encryption engine to encrypt content with the plurality of control words over the plurality of cryptoperiods yielding encrypted content, a first transmission apparatus to broadcast the plurality of first regional-specific control word formation data items and the encrypted content in the primary geographic region, and a communication interface to share data about a plurality of second regional-specific control word formation data items of the first geographical sub-region with at least one regional transmission apparatus of the first geographical sub-region which is operative to broadcast the plurality of second regional-specific control word formation data items of the first geographical sub-region in the first geographical sub-region, wherein each one control word of the plurality of control words may be generated in the plurality of receiver-decoder devices using one of the plurality of first regional-specific control word formation data items and one of the plurality of second regional-specific control word formation data items.

There is also provided in accordance with another embodiment of the present disclosure, a receiver-decoder device including a first receiver to receive a plurality of first regional-specific control word formation data items, the plurality of first regional-specific control word formation data items being broadcast in a primary geographical region including a plurality of different geographical sub-regions, and content encrypted with a plurality of control words over a plurality of respective cryptoperiods, a second receiver to receive a plurality of second regional-specific control word formation data items, the plurality of second regional-specific control word formation data items being broadcast in a first geographical sub-region of the primary geographical region, a first secure processor to perform a control word formation process wherein each one control word of the plurality of control words is calculated using a most recently received first regional-specific control word formation data item of the plurality of first regional-specific control word formation data items and a most recently received second regional-specific control word formation data item of the plurality of second regional-specific control word formation data items as input, or, for each one control word of the plurality of control words, send the most recently received first regional-specific control word formation data item and the most recently received second regional-specific control word formation data item to a second secure processor to perform a control word formation process with the most recently received first regional-specific control word formation data item and the most recently received second regional-specific control word formation data item as input, and decrypt the content using the plurality of control words yielding decrypted content, and a content renderer to render the decrypted content for output to an output device.

Encoded Versus Encrypted

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:

encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

DETAILED DESCRIPTION

Reference is now made to FIG. 1, which is a partly pictorial, partly block diagram view of a conditional access system 10 constructed and operative in accordance with an embodiment of the present disclosure.

For the sake of simplicity, the conditional access system 10 is now described by way of two regions, region A and region B as shown in FIG. 1. Of course this may be generalized to a more complex composition of regions, which may also overlap. In the example of FIG. 1 a broadcaster operating a Headend 12 may want to restrict content decryption to devices in region A. The restriction may be for a particular program, for a particular service (channel) and/or for a particular mode of communication. For example, content broadcast over satellite may only be available in region A whereas content broadcast over cable or Internet may only be available in region B or vice-versa.

The Headend 12 encrypts content yielding encrypted content 14. The encrypted content 14 may be broadcast in a transport stream to receiver-decoder devices (not shown in FIG. 1) disposed in a plurality of end-user premises 16 across a wide geographic region 18, also known as a primary geographical region. A primary geographical region typically includes sub-regions, e.g., sub-region A and sub-region B. For the sake of simplicity in the description below, sub-regions A and B as well as other sub-regions of the wide geographic region 18 will be referred to as regions and not as sub-regions. FIG. 1 shows the Headend 12 using satellite communication via a satellite 20. However, it will be appreciated by those ordinarily skilled in the art that the encrypted content 14 may be broadcast via any other suitable communication system, for example, but not limited to, cable, Internet Protocol (IP) or terrestrial or any suitable combination thereof. The content is typically encrypted with content encryption keys, generally known as control words. The control words may be randomly or pseudo-randomly generated. The transport stream may also include entitlement control messages (ECMs) 22 described in more detail below and in particular with reference to FIG. 4. The entitlement control messages 22 are referred to herein as geographical (GEO) ECMs due to the regional specific nature of the information included therein as will become apparent from the description that follows. It should be noted that the entitlement control messages 22 may also include entitlement information which is common to all geographical regions.

In many conditional access systems entitlement control messages are used possibly in conjunction with data previously stored in the receiver-decoder devices, such as service keys and other secrets, in order to generate control words for decrypting encrypted content. In the conditional access system 10, the entitlement control messages 22 include regional-specific control word formation data item(s) 27 which in itself is not enough to generate control words without other regional-specific control word formation data items 26 that are received by the receiver-decoder devices from a regional transmission apparatus 24. Each control word may be generated in a receiver decoder device using a regional-specific control word formation data item 27 (disposed in one of the entitlement control messages 22) received from the Headend 12 and using a regional-specific control word formation data item 26 received from the regional transmission apparatus 24.

Taking region A as an example, each regional-specific control word formation data item 26 also known as a regional key A (RK_A) is typically distributed throughout region A using the regional transmission apparatus 24 of region A providing an out-of-band (relative to the encrypted content 14 and the entitlement control messages 22 distribution channel) communication system broadcasting in region-A. The regional-specific control word formation data items 26 are typically changed every cryptoperiod or every several cryptoperiods or even more than once per cryptoperiod, by way of example only. The regional-specific control word formation data items 26 may remain unchanged for many cryptoperiods before being changed.

The control words and the regional-specific control word formation data items 26 are typically randomly or pseudo-randomly generated and each regional-specific control word formation data item 27 is generate using a given control word and a given regional-specific control word formation data item 26. So for example, in region A, each regional-specific control word formation data item 27 also known as a correction value (CorrA) is generated from a control word (CW) and one of the regional-specific control word formation data items 26 (e.g., RK_A). The cryptographic method for generating the correction factors may include the following steps. First perform G(CW,RK_A) giving an interim value. G may be any suitable function for example, AES encryption with RK_A as the key and CW as the plaintext. The interim value may then be processed using another algorithm to yield CorrA which may be any suitable inverse process for generating a control word from an entitlement control message, by way of example. This may be similarly repeated in other regions. For example, for a region E (not shown), the regional transmission apparatus 24 may send out region keys (RK_E) in region E and the entitlement control messages 22 may include a correction value (CorrE). The entitlement control messages 22 is typically broadcast to all regions, including region A and E. Correction factor, CorrE, is generated from RK_E and the same control word used to encrypt content being broadcast to region A. Therefore, the content which is broadcast in all regions, including regions A and E, may be encrypted with the same control word.

The regional transmission apparatus 24 may be a cellular base-station residing in the specific region. Other choices could be blimps as in "Project Loon", or radio frequencies such as frequency modulation (FM) and amplitude modulation (AM), or Worldwide Interoperability for Microwave Access (WiMAX), or other wireless communication protocols/stacks that have a geographic range suitable for the desired regional broadcast. It will be appreciated that the receiver-decoder devices include the relevant receiver equipment (antennas/modems etc.) to receive and demodulate the signals carrying the regional-specific control word formation data items 26. FIG. 1 shows one regional transmission apparatus 24 in each region A and B for the sake of simplicity. However, each region may include one or more regional transmission apparatus 24.

If a broadcaster wants a content item to be decrypted in region A and region B, the relevant regional-specific control word formation data items 27 are included in the entitlement control messages 22 and broadcast by the Headend 12 across the wide geographic region 18 including region A and region B. Additionally, the regional transmission apparatus 24 in region A and region B broadcast the relevant regional-specific control word formation data items 26 across region A and region B, respectively.

For geo-limited content, which the broadcaster wants to restrict viewing to region A, the control words to decrypt the encrypted content 14 may only be generated in region A and not in region B. This may be achieved by not including the relevant regional-specific control word formation data items 27 for region B in the entitlement control messages 22 and/or not including the regional-specific control word formation data items 26 for region B in data broadcast from the regional transmission apparatus 24 in region B. In general, it may be more practical to not include the relevant regional-specific control word formation data items 27 for region B in the entitlement control messages 22 for reasons which will be described in more detail below. However, the relevant regional-specific control word formation data items 26 for region B may be alternatively or additionally not included in the data broadcast by the regional transmission apparatus 24 in region B.

Each entitlement control message 22 is called a GEO-ECM as the entitlement control message 22 includes the regional-specific control word formation data item 27 (also known as a correction value) for one or more regions. In the example of FIG. 1, the entitlement control message 22 includes a regional-specific control word formation data item 27 (CorrA) for region A but not for region B. Therefore, even though regional-specific control word formation data items 26 are being broadcast in region A and region B by the regional transmission apparatus 24, the receiver-decoder devices in region B cannot decrypt the encrypted content 14 as the entitlement control message 22 does not include a correction value for region B. Each correction value in the entitlement control message 22 is generally regional specific in that a correction value for one region does not combine to produce a control word with the regional-specific control word formation data item 26 of a different region. Each correction value included in the entitlement control messages 22 may be tagged with the region that the correction value is for and/or with a signal frequency carrying the regional-specific control word formation data items 26 broadcast by the regional transmission apparatus 24 thereby identifying the region as described in more detail below.

Deriving the control words (CWs) is now described in more detail. Deriving the CWs used for content descrambling for a user in a geographical region i by a receiver-decoder device may be performed as follows. First, derive an intermediary control word value (GEO_CW_i) using the correction value for region i from the most recently received entitlement control message 22. Then obtain the regional-specific control word formation data item 26 (RK_i) received from the regional transmission apparatus 24 of region i. Then calculate the content decryption control word, CW, as F(GEO_CW_i, RK_i). F may be, for example, AES-DEC-128 where ciphertext is GEO_CW_i and the key is RK_i. AES is given as an example, and may be replaced by any other secure symmetric cipher such as 3DES. Even a cryptographic hash function could be used, if the final CW can be arbitrary, and is not dictated by some external party, as in simulcrypt for example.

As briefly mentioned above, the regional-specific control word formation data items 26 may be changed in a manner orthogonal to the crypto-period change of the conditional access system 10. More specifically, the period of changing the regional-specific control word formation data items 26 may be shorter or longer than crypto-period used in the conditional access system 10 and may depend on the trade-off between security and performance, wherein changing more frequently generally provides better security while possibly affecting performance.

For a particular time period t, RK_i may be denoted RK_i(t) having a corresponding GEO_CW_i(t) and CW(t). In order for the Headend 12 to encrypt content using the GEO_CW_i(t) and a corresponding RK_i(t), the Headend 12 also needs to know the values RK_i(t) for each time period t. Knowing each value RK_i(t) may be achieved by the Headend 12 sharing data (sending or receiving) with the regional transmission apparatus 24 in each region, typically using a secure channel. A seed may be shared between the Headend 12 and the regional transmission apparatus 24 of each region, using a different seed for each region. The RK_i(t) values may then be generated in each regional transmission apparatus 24 and the Headend 12 based on the relevant seed, for example, but not limited to, using a pseudo-number generator. The seed itself may be originally generated in the Headend 12 or in the regional transmission apparatus 24 using a random number generator or a pseudo-random number generator (PRNG) and sent to the regional transmission apparatus 24 or the Headend 12, respectively, via any suitable communication medium for example, but not limited to, cellular communication or an IP connection or optical fiber. Hence, while the stream of region keys broadcast by each regional transmission apparatus 24 may look like a stream of random keys, they are in fact pseudo-random and generated out of some deterministic PRNG operating in both the Headend 12 and regional transmission apparatus 24 and seeded using the same values. Alternatively, the regional keys may distributed from the Headend 12 directly to each regional transmission apparatus 24 using a suitable medium such as optical fiber or cable, by way of example only, and the seeds are not available each regional transmission apparatus 24 which provides a security benefit, but the medium connecting the Headend 12 directly to each regional transmission apparatus 24 generally has to be established and/or secured.

It should be noted that as the CW is typically randomly or pseudo-randomly generated and the regional keys are also typically pseudo-randomly generated based on a seed, the regional-specific control word formation data items 27 (the correction values) included in the entitlement control messages 22 are typically determined based on the CWs and the region keys.

In the example of FIG. 1, the entitlement control message 22 includes the correction value for region A and not region B, whereas the regional transmission apparatus 24 in both region A and region B are sending the regional-specific control word formation data items 26 (regional keys). As the receiver-decoder devices of region B cannot calculate the CW as the entitlement control message 22 does not include the correction value for region B it seems superfluous for the regional transmission apparatus 24 in region B to be broadcasting the regional-specific control word formation data items 26. However, it may still be advantageous to broadcast the regional-specific control word formation data items 26 for region B, in region B. First, there is generally no harm in the regional transmission apparatus 24 in region B broadcasting the regional-specific control word formation data items 26. Second, the regional-specific control word formation data items 26 may be needed in the future when regional restrictions are lifted or may be needed now for other services and it may take more effort to inform the regional transmission apparatus 24 of when to start and stop the broadcasting of the regional-specific control word formation data items 26.

The above description assumes that a different series of regional keys RK_i(t) is used in every region i, allowing maximal control in terms of security but increasing the number of correction values used in every GEO-ECM. Each regional transmission apparatus 24 synchronizes one series of regional keys with the Headend 12. Those ordinarily skilled in the art of broadcast encryption based on the works of Fiat-Naor and others after them will realize that other schemes of key distribution could be used, such as assigning different synchronized keys for every subset of regional transmission apparatuses 24 in which a very large number of keys needs to be synchronized, but there can be as little as one correction value per GEO-ECM, or various trade-offs that allow covering the desired population of regional transmission apparatus 24 (as opposed to receiver-decoder devices) using a small number of set keys. For example, all regional transmission apparatuses 24 in region A may have a shared, common key denoted Ka. Likewise, all regional transmission apparatuses in region B may have a shared, common key denoted Kb. However, in addition, one may also allocate common keys to all regional transmission apparatuses 24 in geographically neighboring regions. Thus, for example, if regions A and B are neighbors, all the regional transmission apparatuses 24 in regions A and B may have a shared, common key denoted Kab. This increases the number of keys in each regional transmission apparatus 24, but also allows uniting regions A and B into a single, unified region (for certain programs and/or services), which enables the GEO-ECM to carry a single correction factor for both regions A and B, instead of two separate correction factors, one for region A and one for region B.

It should be noted that although FIG. 1 has been described with the correction values being broadcast by the Headend 12 and the regional keys broadcast by the regional transmission apparatus 24, it will be appreciated by one ordinarily skilled in the art that the regional keys may be included in the entitlement control messages 22 and distributed by the Headend 12 and the regional transmission apparatus 24 may broadcast the relevant correction values, e.g. the correction value for region A may be broadcast by the regional transmission apparatus 24 of region A, etc. In such a case the relevant correction values may need to be calculated by the Headend 12, and sent from the Headend 12 to the regional transmission apparatus 24.

Figure 2:
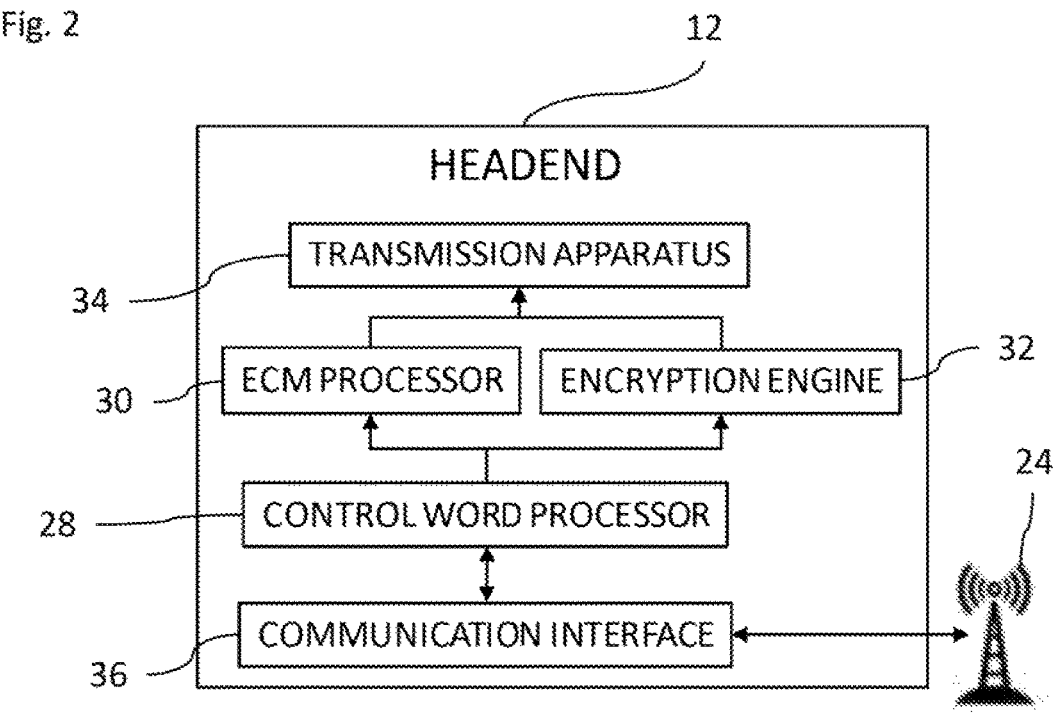
FIG. 2 is a block diagram view of a Headend in the conditional access system of FIG. 1.

Reference is now made to FIG. 2, which is a block diagram view of the Headend 12 in the conditional access system 10 of FIG. 1. The Headend 12 includes a control word processor 28, an ECM processor 30, an encryption engine 32, a transmission apparatus 34 and a communication interface 36.

Figure 3:
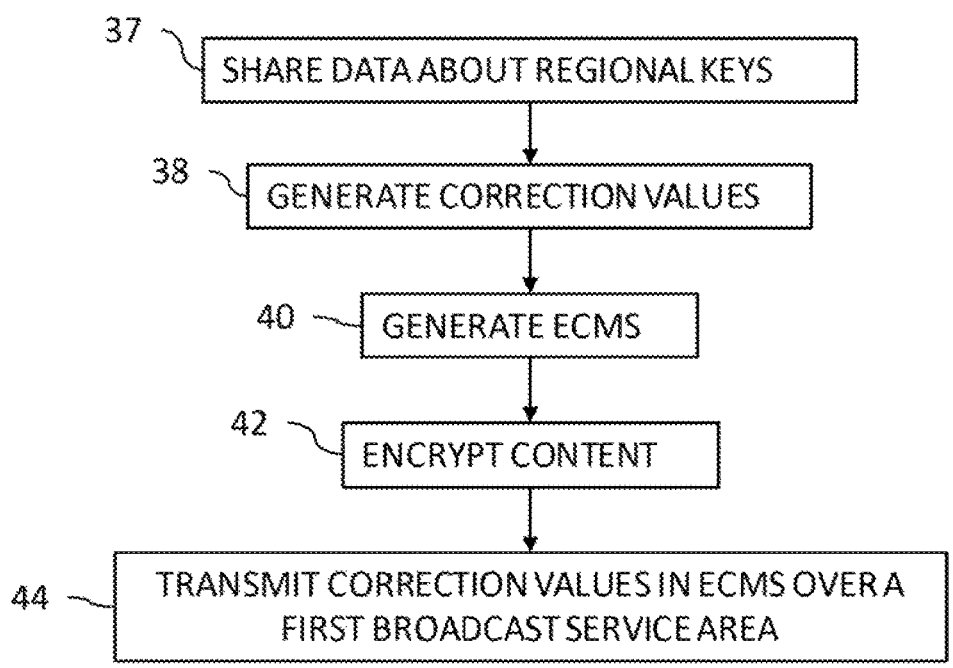
FIG. 3 is a flow chart including steps of an exemplary method of operation of the Headend of FIG. 2.

Reference is now made to FIG. 3, which is a flow chart including steps of an exemplary method of operation of the Headend 12 of FIG. 2. Reference is also made to FIG. 2. The communication interface 36 is operative to share data about the regional-specific control word formation data items 26 (FIG. 1) (e.g., regional keys) of the geographical region i with at least one regional transmission apparatus 24 of the geographical region i (block 37).

The control word processor 28 is operative to generate the regional-specific control word formation data items 27 (FIG. 1) (e.g., correction values) for the geographical region i (e.g., region A of FIG. 1) of a plurality of different geographical regions for use over a plurality of cryptoperiods (block 38). The control word processor 28 is operative to generate each regional-specific control word formation data item 27 (e.g., correction values) of the geographical region i using one of the control words and one of the regional-specific control word formation data items 26 (FIG. 1) for the geographical region i. The regional-specific control word formation data items 27 are used in generating control words in receiver-decoder devices. The control word processor 28 may be operative to generate addition sets of regional-specific control word formation data items 27 for different geographical regions depending on how the Headend 12 has been instructed to restrict decryption of content items. The control word processor 28 is also operative to generate the control words used for encrypting content in the Headend 12. The control word processor 28 is also operative to generate the regional-specific control word formation data items 26 typically from a seed. The control word processor 28 may be operative to receive the seed from the regional transmission apparatus 24 or to generate the seed and send the seed or the regional-specific control word formation data items 26 to the regional transmission apparatus 24.

The ECM processor 30 is operative to generate the entitlement control messages 22 (FIG. 1) (block 40). The entitlement control messages 22 are described in more detail with reference to FIG. 4.

The encryption engine 32 is operative to encrypt content with the control words over the cryptoperiods yielding the encrypted content 14 (FIG. 1) (block 42). In other words, different portions of the content are encrypted with different control words over different cryptoperiods, respectively.

The transmission apparatus 34 is operative to broadcast the regional-specific control word formation data items 27 (typically disposed in the entitlement control messages 22 (FIG. 1)) and the encrypted content 14 (FIG. 1) in a first broadcast service area (block 44) extending over a plurality of different geographical regions.

The regional transmission apparatus 24 of the geographical region i (e.g., Region A) is operative to broadcast the regional-specific control word formation data 26 (FIG. 1) (regional keys) of the geographical region i in a broadcast service area extending over the geographical region i, e.g. region A of FIG. 1. The broadcast service area extending over the geographical region i is geographically smaller than the broadcast service area which extends over the plurality of different geographical regions (e.g., the wide geographic region 18 of FIG. 1).

If content is prepared for decryption in multiple geographic regions, then in each cryptoperiod, the same control word is used by the encryption engine 32 to encrypt that content for decryption by the receiver-decoder devices in the multiple geographic regions, as discussed above in more detail.

Each control word may be generated in the receiver-decoder devices using one of the regional-specific control word formation data items 27 (e.g., correction values) and one of the regional-specific control word formation data items 26 (FIG. 1) (e.g., regional keys) as described in more detail with reference to FIG. 12.

Figure 4:
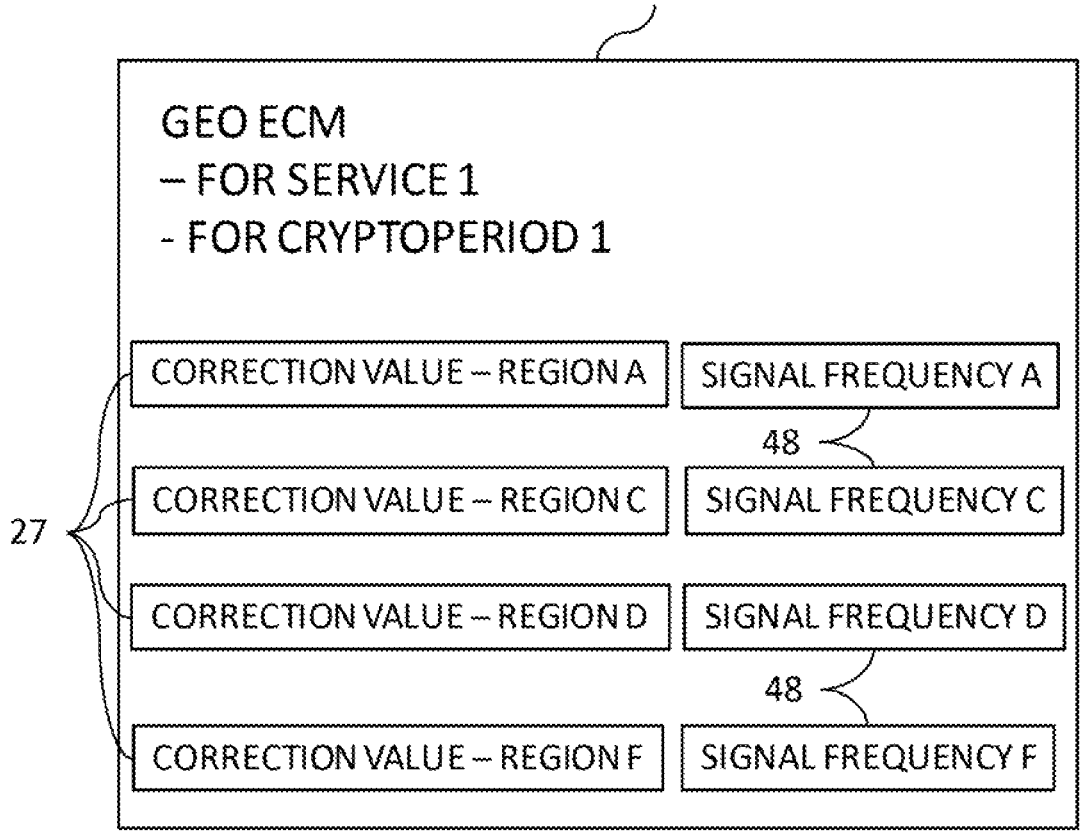
FIG. 4 is an entitlement control message for use in the system of FIG. 1.

Reference is now made to FIG. 4, which is an exemplary entitlement control message 22 for use in the system 10 of FIG. 1. The ECM processor 30 (FIG. 2) is operative to generate entitlement control messages 22. Each entitlement control message 22 typically includes the regional-specific control word formation data item 27 for each geographical region where decryption of the encrypted content 14 (FIG. 1) is allowed for one cryptoperiod. FIG. 4 shows that correction values have been provided for regions A, C, D and F. Each regional-specific control word formation data item 27 included in the entitlement control message 22 may have a corresponding indication 48 of the geographic region associated that regional-specific control word formation data items 27. The indication 48 may include a code associated with a region or similar. Alternatively, or additionally, the indication 48 may include a signal frequency at which the corresponding regional-specific control word formation data items 26 (FIG. 1) are being broadcast by the regional transmission apparatus 24 (FIG. 1) in the region associated with the regional-specific control word formation data items 27 entry in the entitlement control message 22. In such a case, identifying the signal carrying the regional-specific control word formation data items 26 broadcast from the regional transmission apparatus 24 in a receiver-decoder device identifies the corresponding regional-specific control word formation data items 27 entry in the entitlement control messages 22 by virtue of the indication 48 which lists that signal frequency.

Figure 5:
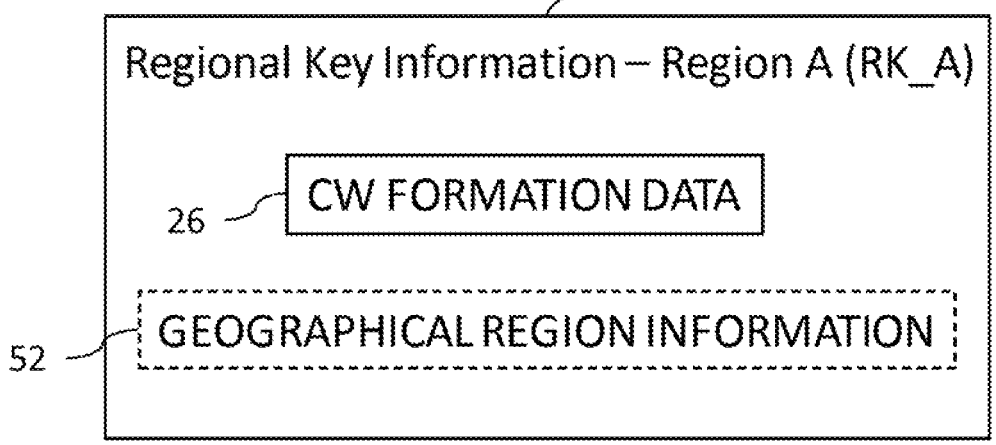
FIG. 5 is a regional key information message for use in the system of FIG. 1.

Reference is now made to FIG. 5, which is a regional key information message 50 for use in the system 10 of FIG. 1.

Each regional-specific control word formation data item 26 (regional key) may be disposed in the regional key information message 50 prior to broadcast by the regional transmission apparatus 24 (FIG. 1). The regional key information message 50 may also include an indication 52 of the geographical region that the regional-specific control word formation data item 26 belongs to. The indication 52 may be used by a receiving device to select the correct regional-specific control word formation data item 27 (FIG. 4) for that same geographical region from the entitlement control messages 22 (FIG. 4).

Figure 8:
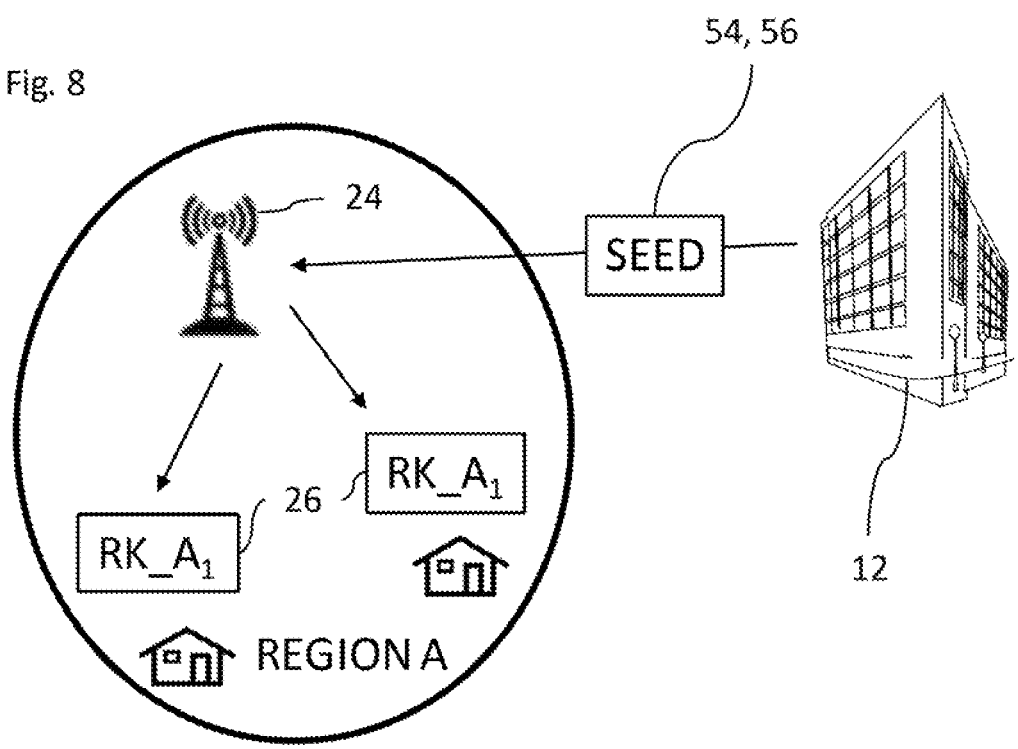
Figure 9:
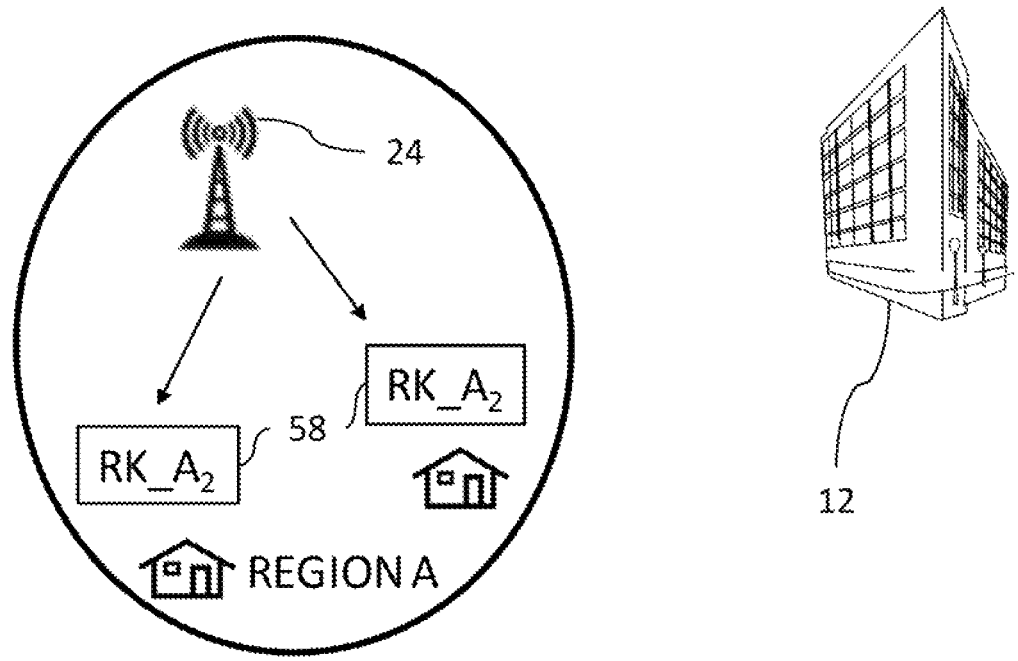
Figure 10:
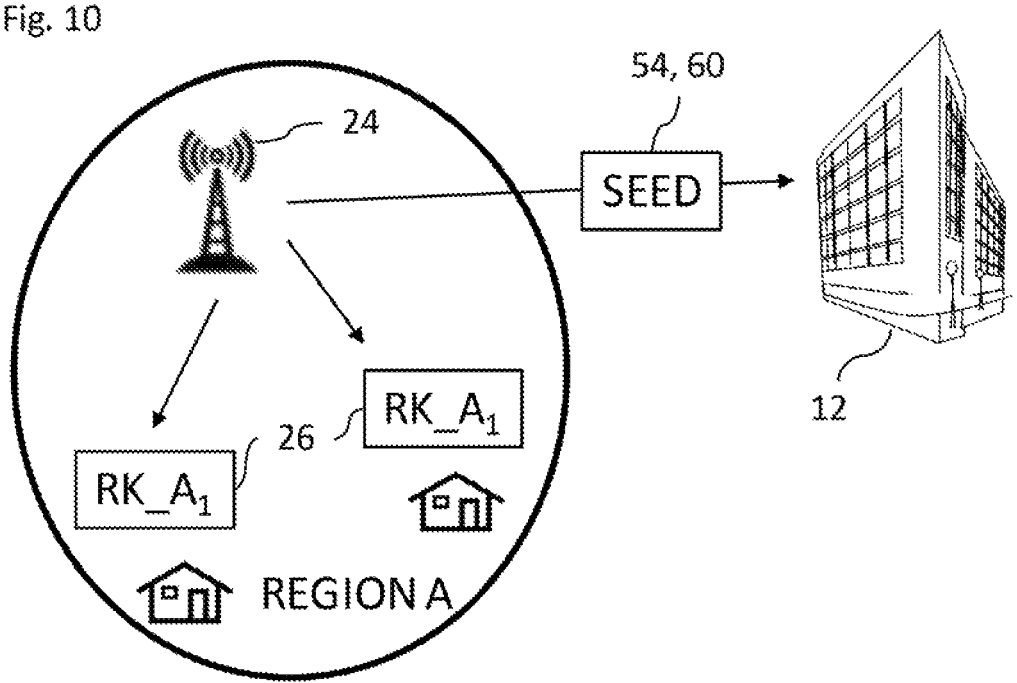

Reference is now made to FIGS. 6-10, which show sharing data 54 between the Headend 12 and the regional transmission apparatus 24 in the system 10 of FIG. 1. As described above, both the Headend 12 and the regional transmission apparatus 24 use the regional-specific control word formation data items 26. The Headend 12 uses the regional-specific control word formation data items 26 to determine the regional-specific control word formation data items 27 and the regional transmission apparatus 24 broadcasts the regional-specific control word formation data items 26 to the receiver-decoder devices. The communication interface 36 (FIG. 2) of the Headend 12 may be operative to send the data 54 about the regional-specific control word formation data items 26 of the geographical region A to the regional transmission apparatus 24 of the geographical region A as shown in FIGS. 6-8. In FIGS. 6 and 7 the data 54 about the regional-specific control word formation data items 26 of the geographical region A includes the regional-specific control word formation data items 26 for broadcast by the regional transmission apparatus 24. In FIG. 6 the region key RK_A$_1$ is sent from the Headend 12 to the regional transmission apparatus 24 and in FIG. 7 the region key RK_A$_2$ is sent from the Headend 12 to the regional transmission apparatus 24. FIG. 8 shows that the data 54 about the regional-specific control word formation data items 26 of the geographical region A includes a seed value 56 from which the regional-specific control word formation data items 26 of the geographical region A are generated by the regional transmission apparatus 24. FIG. 9 shows that the regional transmission apparatus 24 generates a second region key 58 (RK_A$_2$) based on the seed value 56 previously received as shown in FIG. 8. FIG. 10 illustrates an embodiment whereby the regional transmission apparatus 24 in region A sends a seed value 60 to the Headend 12. In particular, the communication interface 36 (FIG. 2) of the Headend 12 is operative to receive the data 56 (the seed value 60) about the regional-specific control word formation data items 26 of the geographical region A from the regional transmission apparatus 24 of the geographical region A.

Figure 11:
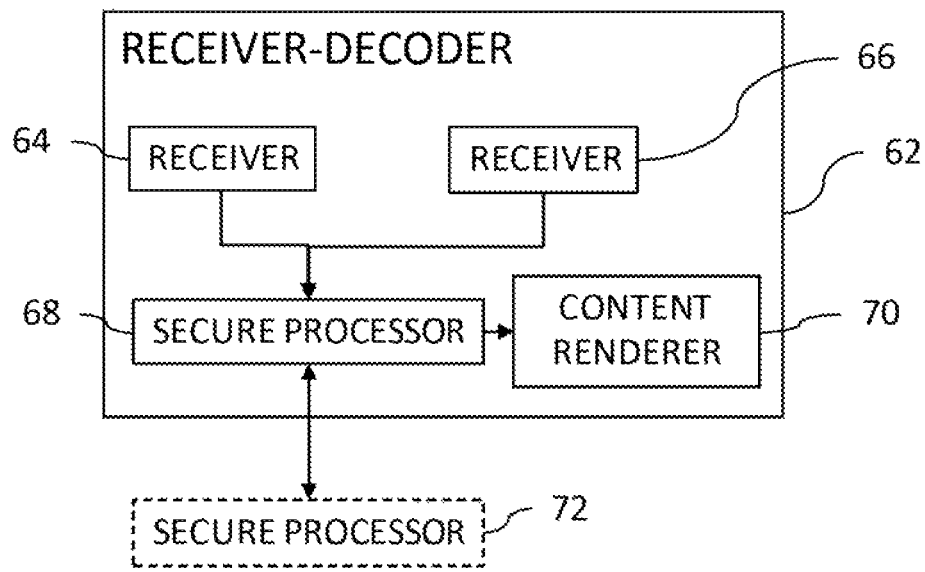
FIG. 11 is a block diagram view of a receiver-decoder device in the conditional access system of FIG. 1.

Reference is now made to FIG. 11, which is a block diagram view of a receiver-decoder device 62 in the conditional access system 10 of FIG. 1. The receiver-decoder device 62 includes: two receivers, a receiver 64 and a receiver 66; a secure processor 68; and a content renderer 70. The secure processor 68 may optionally perform secure processing functions in conjunctions with an external secure processor 72, for example, but not limited to, a smart card reversibly inserted into a slot in the receiver-decoder device 62. The receiver-decoder device 62 may be a dedicated receiver-decoder device such as a set-top box. Alternatively, the receiver-decoder device 62 may be integrated into a display device such as a television. Alternatively, the receiver-decoder device 62 may be implemented in a processing device such as a laptop computer, a desktop computer or a mobile phone, by way of example only.

Figure 12:
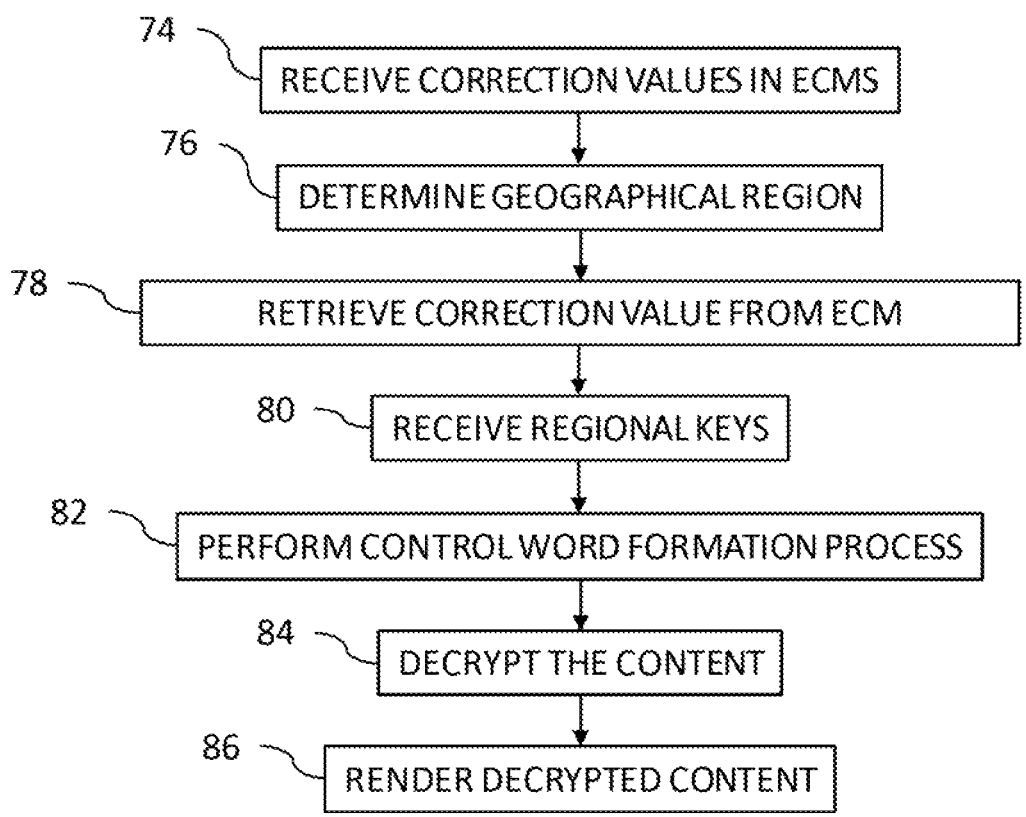
FIG. 12 is a flow chart including steps in an exemplary method of operation of the receiver-decoder device of FIG. 11.

Reference is now made to FIG. 12, which is a flow chart including steps in an exemplary method of operation of the receiver-decoder device 62 of FIG. 11. Reference is also made to FIG. 11. The receiver 64 is operative to receive the regional-specific control word formation data items 27 (e.g., correction values) typically disposed in the entitlement control messages 22 (block 74) from the Headend 12 (FIG. 1). The receiver 64 is also operative to receive the content 14 (FIG. 1) encrypted with the control words over a plurality of respective cryptoperiods. In other words, different portions of the content are encrypted with different control words over different cryptoperiods, respectively.

As described above, each regional-specific control word formation data item 27 is typically received by the receiver 64 in one of the entitlement control messages 22. Each entitlement control messages 22 may include multi-region control word formation data for at least two of the plurality of different geographical regions generally if at least two regions are permitted decryption of the encrypted content 14 (FIG. 1). The multi-region control word formation data may include the regional-specific control word formation data items 27 for each of the at least two different geographical regions. If only one geographical region is permitted decryption of the encrypted content 14, then the entitlement control messages 22 may only, but not necessarily, include regional-specific control word formation data items 27 for that one geographical region.

The secure processor 68 may be operative to determine the geographical region that the receiver-decoder device 62 is disposed in (block 76). This determination may be based on the indication 48 (FIG. 4) in the entitlement control messages 22 and/or the indication 52 (FIG. 5) in the regional key information message 50 described above in more detail with reference to FIGS. 4 and 5. Determination of the geographical region that the receiver-decoder device 62 is disposed in is typically performed if the region is unknown or periodically in any event, for example, but not limited to, once an hour, once a day, on tuning to a new service or starting a new program. The secure processor 68 is operative to retrieve the regional-specific control word formation data item 27 (correction value) of the geographical region that the receiver-decoder device 62 is disposed in from the entitlement control message 22 based on the determined geographical region that the device is disposed in (block 78).

The receiver 66 is operative to receive regional-specific control word formation data items 26 (FIG. 5) (regional keys) (block 80) from the regional transmission apparatus 24 (FIG. 1). The receiver 64 may be operative to receive a first type of communication signal and the receiver 66 may be operative to receive a second type of communication signal different to the first type of communication signal. The receiver 64 may include one of the following by way of example only: a satellite signal receiver, a cable signal receiver; and an Internet Protocol packet receiver. The receiver 66 may include one of the following by way of example only: an amplitude/frequency modulation (AM/FM) radio signal receiver; a cell-tower signal receiver; microwave signal receiver such as a WiMAX signal receiver; and a WiFi signal receiver.

The secure processor 68 is operative to perform a control word formation process wherein each control word is calculated using a most recently received regional-specific control word formation data item 26 and a most recently received regional-specific control word formation data items 27 as input (block 82). The control word formation process was described in more detail above with reference to FIG. 1. Alternatively, the secure processor 68 may be operative to, for each control word, send the most recently received regional-specific control word formation data item 26 and the most recently received regional-specific control word formation data item 27 to the external secure processor 72 to perform the control word formation process with the most recently received regional-specific control word formation data item 26 and the most recently received regional-specific control word formation data items 27 as input. The external secure processor 72 may then be operative to send the resulting control word back to the secure processor 68. The secure processor 68 is operative to decrypt the encrypted content 14 (FIG. 1) using the control words yielding decrypted content (block 84). The content renderer 70 is operative to render the decrypted content for output to an output device (block 86), for example, but not limited to, an external display screen or television screen, a display screen integrated with the receiver-decoder device 62, or a projector and screen arrangement.

In practice, some or all of the above functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A Headend system comprising:
    a control word processor to generate a plurality of first regional-specific control word formation data items, for a first geographical sub-region of a primary geographical region which includes a plurality of different geographical sub-regions, for use over a plurality of cryptoperiods, the plurality of first regional-specific control word formation data items being used in generating a plurality of control words in a plurality of receiver-decoder devices;

an encryption engine to encrypt content with the plurality of control words over the plurality of cryptoperiods yielding encrypted content;
a first transmission apparatus to broadcast the plurality of first regional-specific control word formation data items and the encrypted content in the primary geographic region; and
a communication interface to share data about a plurality of second regional-specific control word formation data items of the first geographical sub-region with at least one regional transmission apparatus of the first geographical sub-region which is operative to broadcast the plurality of second regional-specific control word formation data items of the first geographical sub-region in the first geographical sub-region, wherein each one control word of the plurality of control words may be generated in the plurality of receiver-decoder devices using one of the plurality of first regional-specific control word formation data items and one of the plurality of second regional-specific control word formation data items.

2. The system according to claim 1, further comprising an entitlement control message processor to generate a plurality of entitlement control messages, each one entitlement control message of the plurality of entitlement control messages including one data item of the plurality of first regional-specific control word formation data items for the first geographical sub-region for one cryptoperiod of the plurality of cryptoperiods.

3. The system according to claim 1, wherein for one cryptoperiod of the plurality of cryptoperiods, a same one control word of the plurality of control words is used by the encryption engine to encrypt a part of the content for decryption by the plurality of receiver-decoder devices of at least two sub-regions of the plurality of geographical sub-regions.

4. The system according to claim 1, wherein the communication interface is operative to send the data about the plurality of second regional-specific control word formation data items of the first geographical sub-region to the at least one regional transmission apparatus of the first geographical sub-region.

5. The system according to claim 4, wherein the data about the plurality of second regional-specific control word formation data items of the first geographical sub-region includes the plurality of second regional-specific control word formation data items.

6. The system according to claim 1, wherein the data about the plurality of second regional-specific control word formation data items of the first geographical sub-region is a seed value from which the plurality of second regional-specific control word formation data items of the first geographical sub-region are generated.

7. The system according to claim 1, wherein the communication interface is operative to receive, for the first geographical sub-region, the data about the plurality of second regional-specific control word formation data items of the first geographical sub-region from the at least one regional transmission apparatus of the first geographical sub-region.

8. The system according to claim 1, wherein the control word processor is operative to generate, each one first regional-specific control word formation data item of the plurality of first regional-specific control word formation data items of the first geographical sub-region using one of the plurality of control words and one of the plurality of regional-specific second control word formation data items for the first geographical sub-region.

9. A receiver-decoder device comprising:
a first receiver to receive: a plurality of first regional-specific control word formation data items, the plurality of first regional-specific control word formation data items being broadcast in a primary geographical region including a plurality of different geographical sub-regions; and content encrypted with a plurality of control words over a plurality of respective cryptoperiods;
a second receiver to receive a plurality of second regional-specific control word formation data items, the plurality of second regional-specific control word formation data items being broadcast in a first geographical sub-region of the primary geographical region;
a first secure processor to:
perform a control word formation process wherein each one control word of the plurality of control words is calculated using a most recently received first regional-specific control word formation data item of the plurality of first regional-specific control word formation data items and a most recently received second regional-specific control word formation data item of the plurality of second regional-specific control word formation data items as input; or, for each one control word of the plurality of control words, send the most recently received first regional-specific control word formation data item and the most recently received second regional-specific control word formation data item to a second secure processor to perform a control word formation process with the most recently received first regional-specific control word formation data item and the most recently received second regional-specific control word formation data item as input; and
decrypt the content using the plurality of control words yielding decrypted content; and
a content renderer to render the decrypted content for output to an output device.

10. The device according to claim 9, wherein the first receiver is operative to receive a first type of communication signal and the second receiver is operative to receive a second type of communication signal different to the first type of communication signal.

11. The device according to claim 10, wherein the first receiver is one of the following: a satellite signal receiver; a cable signal receiver, and an Internet Protocol packet receiver.

12. The device according to claim 10, wherein the second receiver is one of the following: an amplitude/frequency modulation (AM/FM) radio signal receiver; a cell-tower signal receiver; microwave signal receiver; and a WiFi signal receiver.

13. The device according to claim 9, wherein:
each one first regional-specific control word formation data item of the plurality of first regional-specific control word formation data items is received by the first receiver in an entitlement control message including multi-region control word formation data for at least two of the plurality of different geographical sub-regions, the one first regional-specific control word formation data item being included in the multi-region control word formation data and being for the first geographical sub-region; and
the first secure processor is operative to: determine a geographical region that the device is disposed in; and retrieve the one first regional-specific control word formation data item from the entitlement control message based on the determined geographical region that the device is disposed in.

14. A method comprising:

generating a plurality of first regional-specific control word formation data items, for a first geographical sub-region being a sub-region of a primary geographical region which includes a plurality of different geographical sub-regions, for use over a plurality of cryptoperiods, the plurality of first regional-specific control word formation data items being used in generating a plurality of control words in a plurality of receiver-decoder devices;

encrypting content with the plurality of control words over the plurality of cryptoperiods yielding encrypted content;

broadcasting the plurality of first regional-specific control word formation data items and the encrypted content in the primary geographical region; and sharing data about a plurality of second regional-specific control word formation data items of the first geographical sub-region with at least one regional transmission apparatus of the first geographical sub-region which broadcasts the plurality of second regional-specific control word formation data items of the first geographical sub-region in the first geographical sub-region, wherein each one control word of the plurality of control words may be generated in the plurality of receiver-decoder devices using one of the plurality of first regional-specific control word formation data items and one of the plurality of second regional-specific control word formation data items.

15. The method according to claim 14, further comprising generating a plurality of entitlement control messages, each one entitlement control message of the plurality of entitlement control messages including one data item of the plurality of first regional-specific control word formation data items for the first geographical sub-region for one cryptoperiod of the plurality of cryptoperiods.

16. The method according to claim 14, wherein for one cryptoperiod of the plurality of cryptoperiods, a same one control word of the plurality of control words is used to encrypt a part of the content for decryption by the plurality of receiver-decoder devices of at least two regions of the plurality of geographical sub-regions.

17. The method according to claim 14, wherein the sharing includes sending the data about the plurality of second regional-specific control word formation data items of the first geographical sub-region to the at least one regional transmission apparatus of the geographical sub-region.

18. The method according to claim 17, wherein the data about the plurality of second regional-specific control word formation data items of the first geographical sub-region includes the plurality of second regional-specific control word formation data items.

19. The method according to claim 14, wherein the data about the plurality of second regional-specific control word formation data items of the first geographical sub-region is a seed value from which the plurality of second regional-specific control word formation data items of the first geographical sub-region are generated.

20. The method according to claim 14, further comprising receiving, for the first geographical sub-region of the plurality of different geographical sub-regions, the data about the plurality of second regional-specific control word formation data items of the first geographical sub-region from the at least one regional transmission apparatus of the first geographical sub-region.

* * * * *

UNITED STATES PATENT AND TRADEMARK OFFICE
CERTIFICATE OF CORRECTION

| | | |
|---|---|---|
| PATENT NO. | : 9,713,070 B1 | Page 1 of 1 |
| APPLICATION NO. | : 15/239874 | |
| DATED | : July 18, 2017 | |
| INVENTOR(S) | : Harel Cain et al. | |

It is certified that error appears in the above-identified patent and that said Letters Patent is hereby corrected as shown below:

In the Claims

Column 14, Line 47, Claim 11, "receiver," to read as --receiver;--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*